US011422880B1

(12) United States Patent
A et al.

(10) Patent No.: US 11,422,880 B1
(45) Date of Patent: Aug. 23, 2022

(54) METHODS AND SYSTEMS FOR DETERMINING CRASH SIMILARITY BASED ON STACK TRACES AND USER ACTION SEQUENCE INFORMATION

(71) Applicant: INTUIT INC., Mountain View, CA (US)

(72) Inventors: Sudhindra A, Bangalore (IN); Sri Aurobindo Munagala, Bangalore (IN)

(73) Assignee: INTUIT INC., Mountain View, CA (US)

(*) Notice: Subject to any disclaimer, the term of this patent is extended or adjusted under 35 U.S.C. 154(b) by 0 days.

(21) Appl. No.: 17/245,622

(22) Filed: Apr. 30, 2021

(51) Int. Cl.
*G06F 11/07* (2006.01)
*G06N 5/02* (2006.01)

(52) U.S. Cl.
CPC ...... *G06F 11/0787* (2013.01); *G06F 11/0721* (2013.01); *G06N 5/02* (2013.01)

(58) Field of Classification Search
CPC .... G06F 11/0787; G06F 11/0721; G06N 5/02
See application file for complete search history.

(56) References Cited

U.S. PATENT DOCUMENTS

| 9,589,074 B2 | 3/2017 | Bhattacharjee et al. | |
|---|---|---|---|
| 10,235,234 B2 | 3/2019 | Xiao et al. | |
| 2016/0140031 A1* | 5/2016 | Sun | G06F 11/3636 717/128 |
| 2017/0371734 A1* | 12/2017 | Gadi | G06F 11/0793 |

OTHER PUBLICATIONS

Sunghun Kim et al., "Crash Graphs: An Aggregated View of Multiple Crashes to Imrprove Crash Triage," 2011 IEEE/IFIP 41st International Conference on Dependable Systems & Networks (DSN), Hong Kong, 2011, pp. 486-493, doi 10.1109/DSN.2011.5958261.
Kevin Bartz et al., "Finding Similar Failures Using Callstack Similarity," SymML 2008, Computer Science, 6 pages.
Roman Vasiliev, et al., "TraceSim: A Method for Calculating Stack Trace Similarity," arXiv 2009.12590v1, 6 pages.
Yingnong Dang et al., "ReBucket: A Method for Clustering Duplicate Crash Reports Based on Call Stack Similarity," >https://www.microsoft.com/en-us/research/wp-content/uploads/2016/07/rebucket-icse2012.pdf>, 10 pages.
Wei Li et al., "How to Group Crashes Effectively: Comparing Manually and Automatically Grouped Crash Dumps," 2012, 10 pages.

* cited by examiner

*Primary Examiner* — Matthew M Kim
*Assistant Examiner* — Kyle Emanuele
(74) *Attorney, Agent, or Firm* — Patterson + Sheridan, LLP

(57) ABSTRACT

Certain aspects of the present disclosure provide techniques for determining crash similarity based on stack traces and user actions associated with a crash event and handling crash events based on the determined crash similarity. An example method generally includes receiving a crash report for a crash event recorded during execution of a software application. A similarity score is generated between the received crash report and one or more historical crash reports associated with historical crash events recorded during execution of the software application. A target set of historical crash reports is selected based on the generated similarity scores for each respective historical crash report. The target set of historical crash reports generally includes crash reports having generated similarity scores exceeding a threshold similarity score. One or more actions are taken to process the received crash report based on the target set of historical crash reports.

20 Claims, 6 Drawing Sheets

```
Crash occurred at: 2020-11-24T10:05:23
Error Code: 1607442776
Product Name: QuickBooks
Product SKU: Desktop Pro 2021
Product Version: 31.0
Product Release: R3
File Name: C:\Users\Public\Documents\Intuit\QuickBooks\Company Files\Home 2020-.qbw
QB Revision Detail: 31.0.4003.R3
QB Build Detail: Photon83_R3_79 Release
Operating System: 10.0.19042
```
— 210

```
Error Type: UnhandledException
Exception ID:
Exception Description: EXCEPTION_ACCESS_VIOLATION
Exception Address: 0x5FCFA158

Exception StackTrace:
ui!QBPowerBarPainter::InitFont [g:\source\qb\platform\visualization\ui\src\qbpbctl.cpp:2305]
mfc140!CDC::Attach [f:\dd\vctools\vc7libs\ship\atlmfc\src\mfc\wingdi.cpp:106]
ui!QBPowerBarPainter::MeasureItem [g:\source\qb\platform\visualization\ui\src\qbpbctl.cpp:2448]
```
— 220

```
Tues Nov 24 10:05:23 Cumulus: 'FILE_NOT_OPEN' Form (No QuickBooks Company Loaded) Form
Tues Nov 24 10:05:22 Cumulus: 'FILE_NOT_OPEN' Push Button (QuickBooks Desktop Login) Cancel
Tues Nov 24 10:05:18 Cumulus: 'FILE_NOT_OPEN' Form (QuickBooks Desktop Login) Form
```
— 230

FIG. 2

```
Crash occurred at: 2020-11-24T08:35:23
Error Code: 1906260238
Product Name: QuickBooks
Product SKU: Account Desktop 2020
Product Version: 30.0
Product Release: R11
File Name: C:\NEW QB Location\Test Company (QuickBooks2020).QBA
QB Revision Detail: 30.0.4011.R11
QB Build Detail: ZincR11_R11_26 Release
Operating System: 10.0.18363
```
310

```
Error Type: ProgrammersFatalError
Exception ID:1906260238
Source File: src\sdkinterface.cpp
Function/Line: SDKInterface::SendRequest:238
```
320

```
Tues Nov 24 10:05:23 CmmaIus:'FILE_NOT_OPEN' Form (No QuickBooks Company Loaded) Form
Tues Nov 24 10:05:22 CmmaIus:'FILE_NOT_OPEN' Push Button (QuickBooks Desktop Login) Cancel
Tues Nov 24 10:05:18 CmmaIus:'FILE_NOT_OPEN' Form (QuickBooks Desktop Login) Form
```
330

FIG. 3

METHODS AND SYSTEMS FOR DETERMINING CRASH SIMILARITY BASED ON STACK TRACES AND USER ACTION SEQUENCE INFORMATION

INTRODUCTION

Aspects of the present disclosure relate to the development and maintenance of software applications, and more specifically to using stack frame similarity to identify defects in a software application to be rectified.

BACKGROUND

Software applications generally include multiple components that may be compiled into a binary (or other package) and deployed onto one or more computing systems for use in a production environment. Prior to deployment into the production environment, a software application may be tested in order to ensure that the application operates as expected and to rectify errors discovered during the testing process. The testing process may execute a suite of tests, which may generally represent or otherwise replicate various scenarios expected to be executed by users of the software application during runtime, to determine whether the software application operates as expected. When the suite of tests are successfully completed, the software application may be compiled and deployed into the production environment.

Testing an application in a development environment using a suite of tests may result in common execution paths within the application being tested. However, uncommon execution paths may not always be tested, and the application may also encounter inputs or other actions in tested paths that also were not validated during testing. Thus, an application may not be guaranteed to work properly, despite having been tested prior to deployment to a production environment.

Regardless of whether an application encounters errors in a testing environment or in a production environment, these errors generally result in the generation of stack traces. Generally, these stack traces include information about the state of an application prior to encountering the error. This information may be used by developers to identify locations within the application at which errors occur during application execution, which may allow developers to focus their attention on addressing code errors in the code associated with the identified locations within the application. However, stack traces may differ for each instance of an error encountered during execution of an application, which may complicate the process of identifying errors and determining how to prioritize addressing errors that exist within a software application.

Thus, techniques are needed for improvements in analyzing stack traces generated during execution of a software application.

BRIEF SUMMARY

Certain embodiments provide a computer-implemented method for handling crash events in a software application. An example method generally includes receiving a crash report for a crash event recorded during execution of a software application. A similarity score is generated between the received crash report and one or more historical crash reports associated with historical crash events recorded during execution of the software application. The similarity score may be generated, by determining for each respective historical crash report of the plurality of historical crash reports: a first similarity metric associated with stack frames in a stack trace included in the received crash report and stack frames in a stack trace included in the respective historical crash report; a second similarity metric associated with user actions associated with the crash report and the respective historical crash report; and a third similarity metric associated with crash location and description information recorded in the received crash report and the respective historical crash report. A target set of historical crash reports is selected based on the generated similarity scores for each respective historical crash report of the one or more historical crash reports. The target set of historical crash reports generally includes crash reports having generated similarity scores exceeding a threshold similarity score. One or more actions are taken to process the received crash report based on the target set of historical crash reports.

Still further embodiments provide a computer-implemented method for managing deployment of a software application in a computing system. An example method generally includes receiving a crash report for a crash event recorded during execution of a software application. A similarity score is generated between the received crash report and one or more historical crash reports associated with historical crash events recorded during execution of the software application. The similarity score may be generated, by determining for each respective historical crash report of the plurality of historical crash reports: a first similarity metric associated with stack frames in a stack trace included in the received crash report and stack frames in a stack trace included in the respective historical crash report; a second similarity metric associated with user actions associated with the crash report and the respective historical crash report; and a third similarity metric associated with crash location and description information recorded in the received crash report and the respective historical crash report. A target set of historical crash reports is selected based on the generated similarity scores for each respective historical crash report of the one or more historical crash reports. The target set of historical crash reports generally includes crash reports having generated similarity scores exceeding a threshold similarity score. It is determined that a number of crash reports in the target set of historical crash reports exceeds a threshold number of crash reports. Deployment of application code associated with the received crash report is blocked until the application code associated with the crash report is unblocked.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 illustrates an example crash report for an unhandled exception including the stack trace and user action sequence information used to determine crash similarity.

FIG. 3 illustrates an example crash report for a handled exception including crash location information and user action sequence information used to determine crash similarity.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
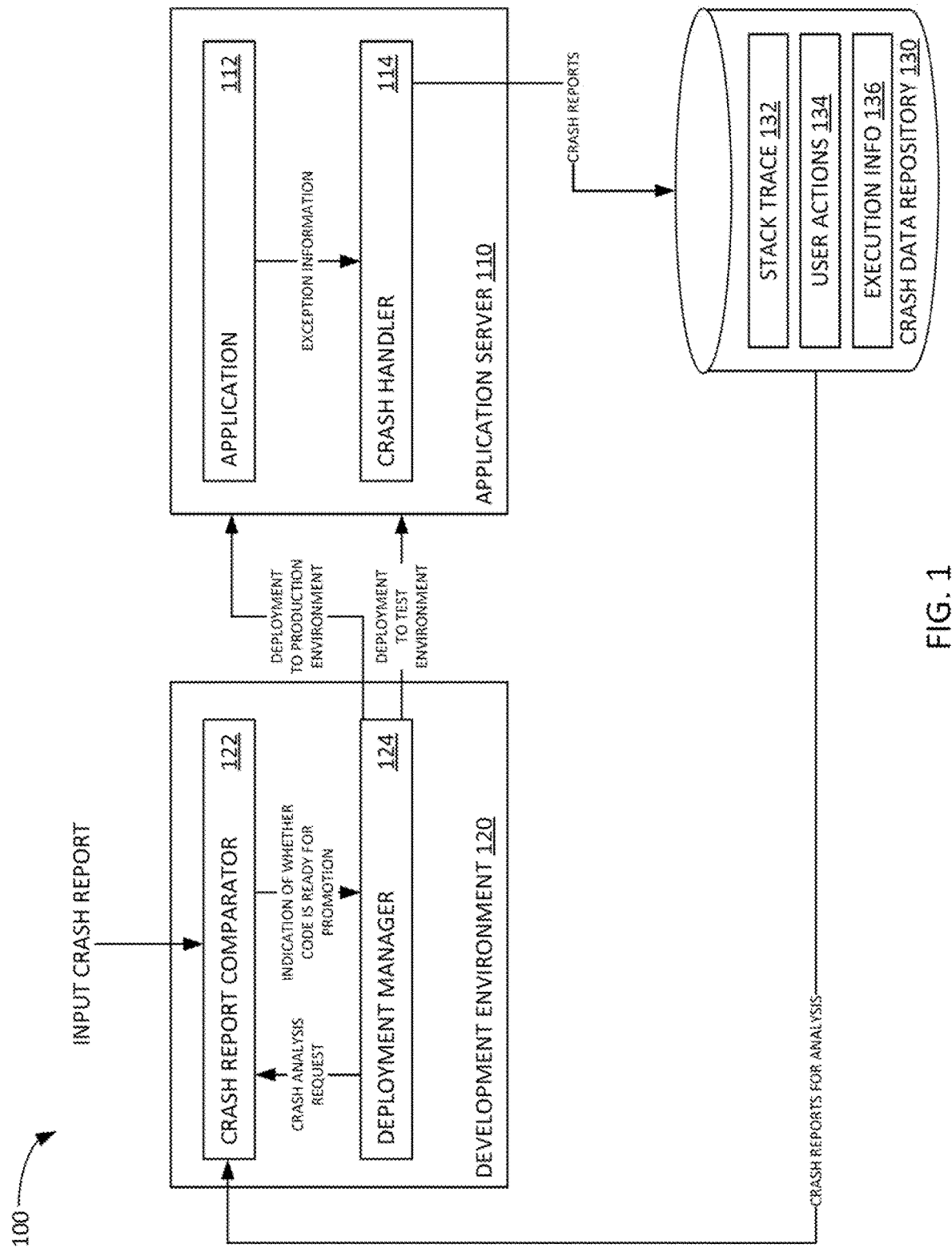
FIG. 1 depicts an example computing environment in which crash similarity is determined based on stack traces and user action sequence information, and in which crashes in software applications are handled based on the determined crash similarity.

Errors are encountered in software applications throughout the lifecycle of an application. Many errors may be caught through executing a software application in a testing environment prior to deployment to a production environment. For example, in traditional software deployment schemes in which an application is delivered through downloads or physical media, application binaries can be "released to manufacturing" after the software application passes verification tests performed against the software application in a test environment. In continuous integration/continuous deployment (CI/CD) pipelines, new versions of application components can be pushed to a production environment (e.g., a cloud compute environment in which the software application is hosted for use by multiple users) when those components pass various validation tests. However, validation testing may not identify all possible errors in a software application, and thus, errors may arise during execution of the software application in the production environment.

To obtain intelligence about errors and determine which errors to prioritize, various techniques can be used. Generally, security-related errors, which may not cause an application to fail, but which potentially expose sensitive information or allow for the exfiltration of sensitive information, may be prioritized based on reports from security firms, penetration tests, "white hat" hackers, or the like. Errors that cause an application to fail—whether handled (e.g., errors from which application execution may be continued) or unhandled (e.g., errors causing an application to terminate)—may be prioritized for resolution based on varying metrics, such as seriousness (e.g., whether the error caused the application to fail gracefully (e.g., such that the application continues to execute or terminates while leaving data in a known state) or fail hard (e.g., such that execution of the application terminates), a number of users affected by a particular error, or the like. However, error reports may identify a location of the error in a software application, but may not include other information that may be useful in determining why the error occurred or a frequency at which particular actions caused the error to occur.

In some cases, each error may be associated with a stack trace that includes information about the state of the application at the time the error occurred. The information generally includes information about a function call path followed to arrive at the location at which the error occurred, information about where the error occurred (e.g., a memory address, a line of code, etc.), and information about the contents of system memory allocated for the application at the time the error occurred. However, for two errors occurring at the same location in a software application, the function call path may differ, the information about the contents of system memory may differ due to operating system-level memory management, and the like. Thus, simple comparisons to determine whether two stack traces, associated with different error events, represent the same error may fail. This may complicate the process of identifying errors in a software application and addressing those errors. Further, because these errors may be caused by different user actions, even if two stack traces are identical, it may be difficult to identify the cause of these errors and take remedial action to prevent these errors from occurring in later releases of the software application.

Aspects of the present disclosure use order-independent stack frames in a stack trace associated with an error, as well as information about user actions performed within a software application leading up to the error, to determine crash similarity. By using order-independent execution information associated with an error and information about user actions performed within a software application to identify similar errors, software development systems can more quickly and accurately identify similar errors generated during execution of the software application. Further, latent similarities between errors may be identified where the stack traces do not explicitly reveal those similarities (e.g., due to order-dependent differences between stack traces across different crash reports). Thus, the computing system can take various actions to improve the quality of software applications deployed to a production environment, such as blocking deployment of the software application to a production environment until these errors are resolved, flagging areas in source code that are regularly identified in error reports as being associated with error reports, and the like. This may improve the stability of software applications developed and deployed in various environments, reduce memory or storage usage for crash reports, and reduce processing time spent handling errors within a software application.

Example Handling of Crash Events Based on Crash Similarity Determination Based on Stack Traces and User Action Sequence Information FIG. 1 illustrates an example computing environment 100 in which order-independent stack frames in a stack trace associated with a crash event, as well as information about user actions performed within a software application leading up to the crash event and other execution information, are used to determine crash similarity and handle crash events in a software application based on crash similarity metrics, in accordance with certain aspects of the present disclosure. Generally, a crash event may be represented by an exception (whether handled or unhandled) or other situations in which an application fails to execute as expected. As illustrated, computing environment 100 includes an application server 110, development environment 120, and crash data repository 130.

Application server 110 is generally representative of one or more physical or virtual computing devices on which an application may be executed and crash events during execution of the application may be recorded. Application server 110 may host a test environment and a production environment in which different versions of an application may be hosted. In some aspects, the test environment may be hosted on a first set of resources on the application server 110, and the production environment may be hosted on a second set of resources on the application server 110. For example, the test environment and the production environment may be hosted on different virtual machines, in different containers in a containerized execution environment, or the like. As illustrated, application execution environment includes an application 112 and a crash handler 114.

Application 112 generally represents an application that is deployed for execution with the test and/or production environments on application server 110. While application 112 is illustrated as executing on an application server 110, it should be recognized that application 112 in other embodiments can execute on mobile devices, wearable devices, or other computing devices on which applications can be deployed and executed. Generally, application 112 may expose various interfaces through which users of the application can invoke application functionality, cause the application to communicate with remote resources, and the like. Application 112 may include code that allows the application 112 to fail in a controlled manner when crash events are encountered during execution. However, not all crash events that may arise within application 112 may be handled to cause the application 112 to fail in a controlled manner, and thus, application 112 may fail in an uncontrolled manner.

Crash handler 114 generally monitors the execution state of application 112 and handles crash event recording and recovery when crash events are encountered during the execution of application 112 on application server 110. Generally, crash handler 114 may record stack traces and associated user action information for a crash event and commit the recorded stack traces and associated user action information to crash data repository 130. As discussed in further detail below, crash report comparator 122 in development environment 120 can use the information in crash data repository 130 in identifying similar crash events and taking one or more actions based on the identification of these similar crash events. Generally, crash handler 114 may record handled exceptions (which may allow for an application to fail in a controlled manner or allow for continued execution of the application) and unhandled exceptions (which may cause an application to fail in an uncontrolled manner) differently.

For handled exceptions, crash handler 114 may record information such as the name of the module in which the crash event occurred, the file name associated with the module in which the crash event occurred, the name of the function that was executing when the crash event occurred, the line of code at which the crash event occurred, and the like. For unhandled exceptions, crash handler 114 may record information such as the contents of a memory stack at the time at which the crash event occurred, the name of the module in which the crash event occurred, an exception description, and the like.

Development environment 120 generally is representative of one or more physical or virtual computing devices on which crash events recorded during execution of application 112 on application server 110 may be used to identify similar crash events and control deployment of application source code (and/or the application binaries derived therefrom) to application server 110. As illustrated, development environment 120 includes a crash report comparator 122 and a deployment manager 124.

Crash report comparator 122 generally receives information specifying a report for a source crash event and searches for reports of similar crash events from crash data repository 130. Crash report comparator 122 may be invoked, for example, through a graphical user interface in a software development tool (e.g., an integrated development environment) allowing a user of the software development tool to specify the source crash event for analysis. In some aspects, crash report comparator 122 may be invoked by deployment manager 124 to determine whether application source code is in a stable state for deployment to a production environment on application server 110, as discussed in further detail below.

To analyze a report for a source crash event and identify similar crash reports in crash data repository 130, crash report comparator 122 generally compares the stack traces in these crash reports in an order-independent manner and uses user actions associated with the crash report to generate a similarity score for each of a plurality of target (historical) crash reports in crash data repository 130. Generally, the crash reports in crash data repository 130 may include a stack trace 132, user actions 134, and execution information 136.

To analyze exceptions recorded during execution of application 112, crash report comparator 122 can determine whether each stack frame in a stack trace (e.g., stack frames in stack trace 220 illustrated in FIG. 2) in a source crash report also exists in a stack trace in a target crash report in an order-independent manner. Generally, each stack frame in the stack trace may represent a function that has been invoked during execution of the application, and the stack trace represents all of the functions invoked during execution of the application at the time a crash report was generated. Additionally, crash report comparator 122 can determine whether each stack frame in the stack trace in the target crash report also exists in the stack trace in the source crash report, also in an order-independent manner. Generally, this may result in the calculation of a stack trace similarity metric associated with stack frames in the stack traces associated with the source and target crash reports.

Generally, analyzing stack frames in an order-independent manner may entail determining whether a stack frame is present in two crash reports, irrespective of the order in which these stack frames appear in the stack trace. Because application execution may be somewhat nondeterministic (e.g., two different stack traces for the same function may not reflect the same order of execution due, for example, to the use of multiple execution threads, parallel execution techniques, out-of-order execution by a processor, or the like), analyzing stack frames in an order-independent manner may allow for matching crashes to be identified while accounting for the nondeterministic characteristics of application execution. For example, assume that the stack trace in the source crash report includes the elements {A, B, C, D} in that order and the stack trace in the target crash report includes the elements {A, C, B, D, E} in that order. In comparing the source crash report and the target crash report, crash report comparator 122 can calculate a first percentage corresponding to the percentage of elements in the source crash report that are included in the target crash report and a second percentage corresponding to the percentage of elements included in the target crash report that are included in the source crash report, regardless of the order in which these elements occur in the source and target crash reports. In this example, the first percentage may be 100%, as the stack traces in the source and target crash reports both include elements A, B, C, and D. The second percentage may be 80%, as four of the five elements in the stack trace in the target crash report also appear in the stack trace in the source crash report.

For both unhandled exceptions and handled exceptions, crash report comparator 122 can compare user actions associated with the source and target crash reports to calculate a user action similarity metric associated with user actions associated with the source and target crash reports. User actions generally refer to actions performed within application 112 by the user of the application 112, such as interactions with user interface elements (e.g., clicks, taps, text input/deletion, etc.), input provided to the application 112 in specified files or data streams, or the like. Generally, the user actions associated with the source and target crash reports (e.g., user actions 230 illustrated in FIG. 2) may include a set of user actions recorded prior to the occurrence of the exception for which the source and target crash reports were recorded. Similarly to the comparison of stack traces discussed above, crash report comparator 122 can compare the user actions associated with the source and target crash reports in an order-independent manner. That is, to measure the second similarity metric, crash report comparator 122 can determine whether a user action in the set of user actions associated with the source crash report is also included in the set of user actions associated with the target crash report. Similarly, crash report comparator 122 can determine whether a user action in the set of user actions associated with the target crash report is also included in the set of user actions associated with the source crash report.

Crash report comparator 122 may additionally compare crash location and description information recorded in the source and target crash reports to calculate an execution environment similarity metric. The execution environment similarity metric may be calculated, for example, based on a closeness (e.g., percentage match) between module names and exception descriptions included in the crash reports for an unhandled exception or between module names, file names, function names, and line numbers included in the crash reports for a handled exception. In some aspects, crash report comparator 122 can make these determinations after stripping out, or at least disregarding, information that may not be probative of whether two crash reports are similar. For example, crash report comparator 122 can strip, from the source and target crash reports, or disregard information such as timestamps that may be recorded in a crash report, as well as other information that may not be relevant to comparing different crash reports and determining a level of similarity between different crashes represented by different crash reports.

After calculating the similarity metrics discussed above, crash report comparator 122 can calculate a similarity score representing a measurement of how similar the target crash report is to the source crash report. The similarity score may be, for example, calculated based on a weighted average of the stack trace similarity metric (based on a comparison of stack frames in the stack traces for the source and target crash reports), the user action similarity metric (based on a comparison of user actions associated with the source and target crash reports), and the execution environment similarity metric (based on the crash location and description information associated with the source and target crash reports).

For example, where a crash report is for an unhandled exception, the similarity score may be calculated as a weighted average of (1) the percentage of stack frames in a stack trace for the source crash report present in a stack trace for the target crash report; (2) the percentage of stack frames in the stack trace for the source crash report present in the stack trace for the target crash report; (3) the percentage of user actions associated with the source crash report that are also associated with the target crash report; (4) the percentage of user actions associated with the target crash report that are also associated with the source crash report; (5) a closeness of the module names included in the source and target crash reports; and (6) a closeness of the exception descriptions included in the source and target crash reports.

In another example, where the crash report is for a handled exception, the similarity score may be calculated as a weighted average of (1) a closeness of the module names included in the source and target crash reports; (2) a closeness of the file names included in the source and target crash reports; (3) a closeness of the function names included in the source and target crash reports; (4) a closeness of the line numbers included in the source and target crash reports; (5) the percentage of user actions associated with the source crash report that are also associated with the target crash report; and (6) the percentage of user actions associated with the target crash report that are also associated with the source crash report.

The weights assigned to each component of the weighted average may be, for example, defined a priori based on an importance of each metric to a similarity determination. These weights may be periodically adjusted to reflect current determinations of just how important each metric is in determining a similarity score between a source and target crash report. In some examples, the weights may be determined using various heuristic techniques, statistical analyses, and/or dynamic (machine learning-based) techniques.

In some aspects, where crash report comparator 122 is used to identify similar crashes to a source crash report provided to crash report comparator 122 as input, crash report comparator 122 can generate a sorted list of crash reports and output the sorted list of crash reports for display to a user. The sorted list of crash reports may, for example, include crash reports having a similarity score over a defined threshold similarity score, which may reduce the number of crash reports output by crash report comparator 122 and may allow for only the most relevant crash reports to be output for further analysis. In some aspects, the sorted list of crash reports may include crash reports sorted in descending order from crash reports with the highest similarity scores to crash reports with the lowest similarity scores (but are still above the threshold similarity score). In some aspects, crash reports may be annotated with information identifying similarities to the source crash report. For example, matching stack frames, user actions, and execution environment information may be highlighted to allow for improved ease in visually identifying similarities between the source crash report and reports in the sorted list of crash reports.

Deployment manager 124 generally represents a software component that controls deployment of application source code from a test environment on application server 110 to a production environment on application server 110 (or a different application server) based on crash similarity identified by crash report comparator 122. In some aspects, to determine whether application source code is ready for promotion from a test environment to a production environment, deployment manager 124 can identify a set of unique crash reports in crash data repository 130 to use as an input into crash report comparator 122. The set of unique crash reports in crash data repository 130 may include, for example, crash reports generated within a threshold amount of time prior to the current time or crash reports recorded between the last time code was promoted to a production environment and the current time.

For each respective unique crash report in the identified set of unique crash reports, deployment manager 124 can instruct crash report comparator 122 to identify similar crash reports to the respective unique crash report. If deployment manager 124 determines that the number of similar crash reports to the respective unique crash report exceeds a threshold value, deployment manager 124 can determine that the application source code is not ready for promotion to a production environment and can block the code from promotion until the underlying problems in the application source code causing the problem are fixed. In some aspects, the comparison of the number of similar crash reports may be performed on a per-unique-crash-report basis or on an aggregate basis (e.g., across the set of identified unique crash reports).

In some aspects, deployment manager 124 may also be used to determine whether a version of application 112 deployed to a production environment on application server 110 should be reverted to a previous version of the application. To do so, deployment manager 124 can determine that the number of crash reports in a target set of crash reports exceeds a threshold number of crash reports, and that the crash reports in the target set of crash reports are each associated with the current version of the application 112 deployed in a production environment. Based on this determination, deployment manager 124 can revert the deployed version of the application in the production environment from the current version of the software application to a previous version of the software application. The previous version may be, for example, the most recent version of the software application in which the crash reports in the target set of crash reports was not generated.

Example Crash Report Content for Determining Similarity of Crash Reports

FIG. 2 illustrates an example crash report 200 including a stack trace, execution environment information, and user action information that may be used in calculating a similarity score between two crash reports for unhandled exceptions within a software application. As illustrated, crash report 200 includes execution information 210, stack trace 220, and user actions 230.

Execution information 210 includes data identifying the properties of the application and the execution state of the application when the exception associated with crash report 200 was generated. The execution information may include, for example, a version of the application, file name information for the source code file associated with the module in which the exception was generated, information about the operating environment in which the application executed, stack traces from other applications that were executing when the exception associated with crash report 200 was generated, application domain information, and the like. In some aspects, execution information 210 may identify one or more files including the raw data from which crash report 200 was generated. These files may include, for example, an archive including a memory dump file and a file in which other information (e.g., user actions) about the exception was recorded. The file in which the other information was recorded may include, for example, a JavaScript Object Notation (JSON) file, an eXtendible Markup Language (XML) file, an unstructured (e.g., flat) file, or any other data structure in which execution environment information and user action information may be stored.

Stack trace 220 generally includes a set of stack frames in memory at the time at which the exception was generated. Generally, the stack frames may identify each function included in a call stack in the order in which each function was invoked. In some aspects, as illustrated, the stack frames may identify the invoked function and a location in application source code at which the function is located. The location information may be, for example, a specific code file and a line number in the code file at which the function is located. In some aspects, each stack frame may further include information about the arguments provided as input into each function identified in the stack trace 220. Generally, stack trace 220 may replicate the structure of a call stack such that the order in which functions were invoked are preserved. The call stack generally represents a data structure implemented as a last-in-first-out (LIFO) structure in which information about the active functions in an application is stored, with the most recent (e.g., the active) function is at the top of the call stack and the least recent function is at the bottom of the call stack. Thus, stack trace 220 may represent the call stack as a series of lines, where each line represents a function call. Within the series of lines, the first function call represents the most recent function invoked prior to the occurrence of the exception and the last function call (on the last line in the series of lines) represents the earliest function invoked and the function to which control will ultimately return after execution of most recently invoked function and any intervening functions.

User actions 230 generally include information identifying the recorded user interface actions performed by the user prior to generation of the exception. The information identifying the recorded user interface actions may include, for example, timestamped information identifying user interface elements with which a user interacted and the type of interaction. For example, the information in user actions 230 may include indications that a user loaded a form, clicked on one or more buttons, radio buttons, check boxes, or other selectable user interface elements, entered text into editable user interface elements, or the like.

FIG. 3 illustrates an example crash report 300 including a stack trace, execution environment information, and user action information that may be used in calculating a similarity score between two crash reports for handled exceptions within a software application. As illustrated, crash report 300 includes execution information 310, error information 320, and user actions 330.

Execution information 310, like execution information 210 illustrated in FIG. 2, includes data identifying the properties of the application and the execution state of the application when the exception associated with crash report 300 was generated. In some aspects, execution information 310 may identify one or more files including the raw data from which crash report 300 was generated. These files may include, for example, an archive including a memory dump file and a file in which other information (e.g., user actions) about the exception was recorded. The file in which the other information was recorded may include, for example, a JavaScript Object Notation (JSON) file, an eXtendible Markup Language (XML) file, an unstructured (e.g., flat)

file, or any other data structure in which execution environment information and user action information may be stored.

Error information 320 includes information about the underlying error that caused the generation of the handled exception. Because handled exceptions allow for an application to fail gracefully or to recover from a failure, the error information 320 included in a crash report for a handled exception may include different information from the stack trace 220 of crash report 200 illustrated in FIG. 2. For example, as illustrated, error information 320 may include information about the type of the error, an error code associated with the exception, and a location in a specific source code file at which the error occurred. The location information may identify the class or module executing when the error occurred, the function that was executing when the error occurred, and the line of code at which the error occurred.

User actions 330, like user actions 230 illustrated in FIG. 2, generally include information identifying the recorded user interface actions performed by the user prior to generation of the exception. The information identifying the recorded user interface actions may include, for example, timestamped information identifying user interface elements with which a user interacted and the type of interaction. For example, the information in user actions 330 may include indications that a user loaded a form, clicked on one or more buttons, radio buttons, check boxes, or other selectable user interface elements, entered text into editable user interface elements, or the like.

Figure 4:
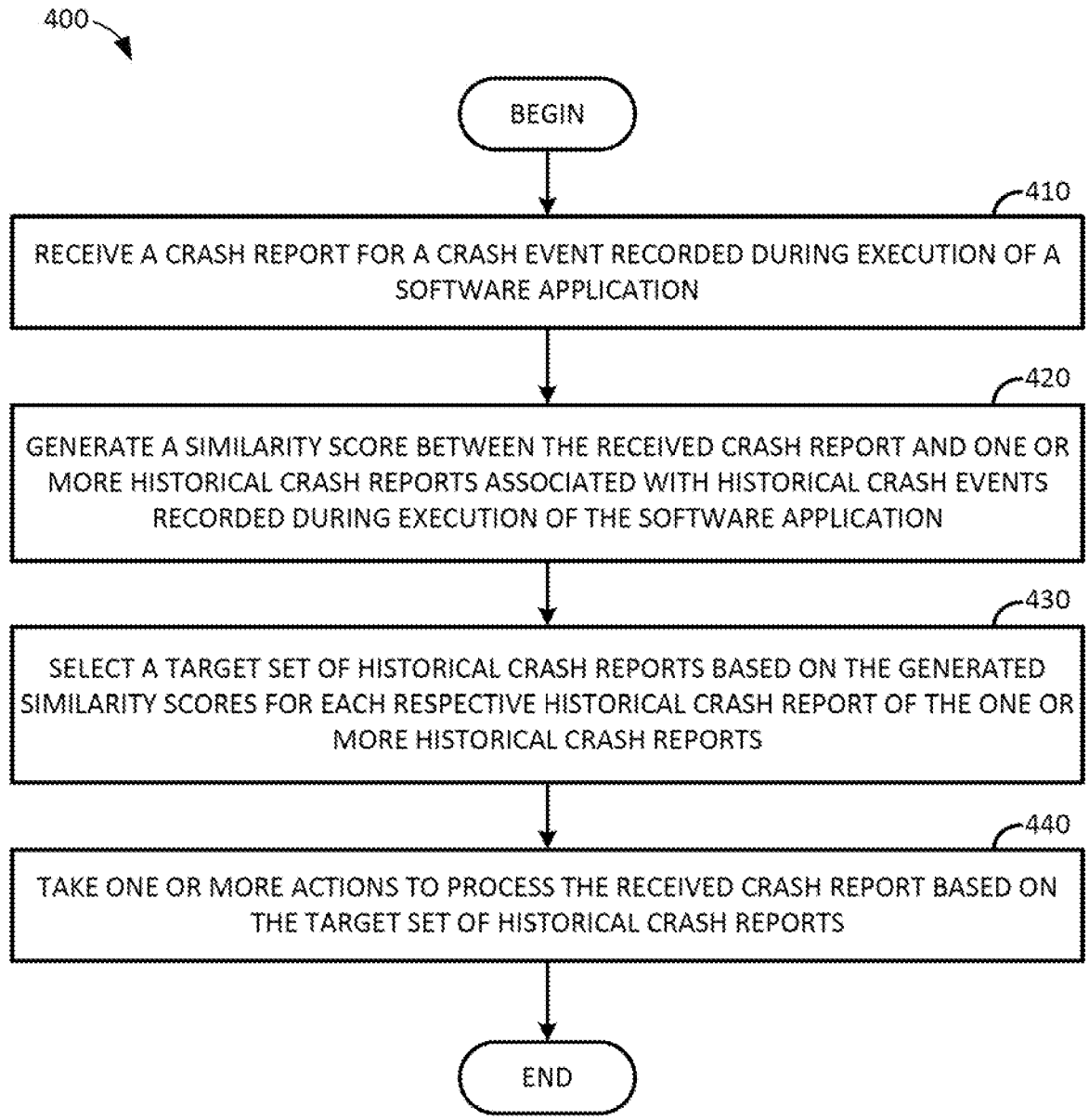
FIG. 4 illustrates example operations for determining crash similarity based on stack traces and user action sequence information and handling crash events in a software application based on the determined crash similarity.

Example Computer-Implemented Method for Handling Crash Events Based on Crash Similarity Determination Based on Stack Traces and User Action Sequence Information FIG. 4 illustrates example operations 400 for determining crash similarity based on stack traces and user action sequence information and handling crash events in a software application based on the determined crash similarity. The operations described herein may be performed, for example, by a crash report comparator executing on a computing system in a distributed computing environment (e.g., by crash report comparator 122 executing in development environment 120, as illustrated in FIG. 1).

As illustrated, operations 400 begin at block 410, where a system receives a crash report for a crash event recorded during execution of a software application. In some aspects, the system can receive the crash report from a user of an integrated development environment or crash information search system (e.g., when a crash report comparator is used to identify similar crash reports for further offline analysis). In some aspects, the system can receive the crash report as a set of crash reports from a deployment manager used to manage deployment of application source code from a test environment to a production environment. Generally, the crash report may be an archive including at least a memory dump file associated with the crash report and a file including other information, such as execution environment information (e.g., crash location and description information), symbol information linking information in a memory dump file to functions executing or included in a call stack at the time the crash event occurred, and user action information, that may be used to determine crash similarity, as discussed above.

In some aspects, the crash event recorded in the crash report may be an unhandled exception encountered during execution of the software application. The crash location and description information included in the crash report may include, for example, a function name (e.g., associated with each stack frame included in a stack trace included in the crash report), a module name (e.g., associated with each stack frame included in a stack trace included in the crash report), and/or an exception description. The exception description may be, for example, one of a plurality of exception descriptions defined by the programming language in which the application source code is written, descriptions defined by a compiler/linker used to compile the application source code, descriptions defined by a language virtual machine used for just-in-time compilation and execution of the application source code, or the like.

In some aspects, the crash event recorded in the crash report may be a handled exception encountered during execution of the software application. The crash location and description information included in the crash report may include, for example, an exception description, module name, function name, and/or code line number at which the crash event occurred.

At block 420, the system generates a similarity score between the received crash report and one or more historical crash reports associated with historical crash events recorded during execution of the software application. To generate the similarity score, the system can generate a plurality of similarity metrics between the received crash report and each respective historical crash report of the one or more historical crash reports. For example, the plurality of similarity metrics may include: a first similarity metric associated with stack frames in a stack trace included in the received crash report and stack frames in a stack trace included in the respective historical crash report; a second similarity metric associated with user actions associated with the crash report and the respective historical crash report; and a third similarity metric associated with crash location and description information recorded in the received crash report and the respective historical crash report.

In some aspects, the first similarity metric may be calculated as a pair of similarity calculations. A first similarity calculation may include determining a percentage of stack frame entries in the stack trace included in the received crash report that are also present in the stack trace included in the respective historical crash report. A second similarity calculation may include determining a percentage of stack frame entries in the stack trace included in the respective historical crash report that are also present in the stack trace included in the received crash report. Both of these similarity calculations may be performed in an order-independent manner such that each similarity calculation is determined irrespective of an order in which the individual stack frame entries are included in the stack traces included in the received and respective historical crash reports.

In some aspects, the second similarity metric may be calculated as a pair of similarity calculations. A first similarity calculation may include determining a percentage of user actions in the received crash report that are also present in the user actions in the respective historical crash report. A second similarity calculation may include determining a percentage of user actions in the respective historical crash report that are also present in the user actions in the received crash report. Both of these similarity calculations may be performed in an order-independent manner such that each similarity calculation is determined irrespective of an order in which the individual user action entries are included in the received and respective historical crash reports.

In some aspects, the similarity score may be generated as the weighted average of the first similarity metric, the second similarity metric, and the third similarity metric. The weighting may be defined a priori and updated from time to time to reflect adjustments in the importance of each of these metrics in identifying similar crash reports.

At block 430, the system selects a target set of historical crash reports based on the generated similarity scores for each respective historical crash report of the one or more historical crash reports. The target set of historical crash reports generally includes historical stack traces having generated similarity scores exceeding a threshold similarity score.

At block 440, the system takes one or more actions to process the received crash report based on the target set of historical crash reports.

In some aspects, the received crash report may be received in a query to identify historical crash events similar to the crash event recorded during execution of the software application. The one or more actions to process the received crash report may include displaying, within a graphical user interface in a software development environment, the target set of historical crash reports and the similarity score associated with each respective historical crash report in the target set of historical crash reports.

In some aspects, the one or more actions may include managing deployment of application source code to a production environment. Managing the deployment of application source code may include, for example, blocking deployment of application source code from a test environment to a production environment and/or reverting the version of an application deployed in a production environment to a previous version of the application.

In some aspects, the system can determine that a number of crash reports in the target set of historical crash reports exceeds a threshold number of historical crash reports. Generally, the historical crash reports associated with historical crash events recorded during execution of the software application may include crash reports generated for a current version of the software application deployed in the production environment. The system can then block deployment of application source code associated with the received crash report from a development environment to a production environment. The block on deployment of the application source code may remain in place until the application code associated with the received crash report is unblocked (e.g., after validation testing indicates that similar crash reports are no longer generated or are generated at a rate lower than a threshold rate).

In some aspects, the system can determine that similar crash reports to the received crash report have already been identified. If the received crash report is similar to previously analyzed crash reports, the received crash report can be marked as a previously identified crash (or similar to previously identified types of crashes). A running count of previously identified crashes (or types of crashes) may be maintained, and this running count can be used to elevate more frequently experienced crashes for further review and remediation.

In some aspects, the system can determine that a number of crash reports in the target set of historical crash reports exceeds a threshold number of historical crash reports and that crash reports in the target set of historical crash reports are associated with a current version of the software application deployed in a production environment. Because the crash reports indicate a persistent problem that should be rectified, the system can revert from the current version of the software application to a previous version of the software application in the production environment. Generally, the previous version of the software application may include a latest version of the software application in which the crash reports in the target set of crash reports were not generated.

Figure 5:
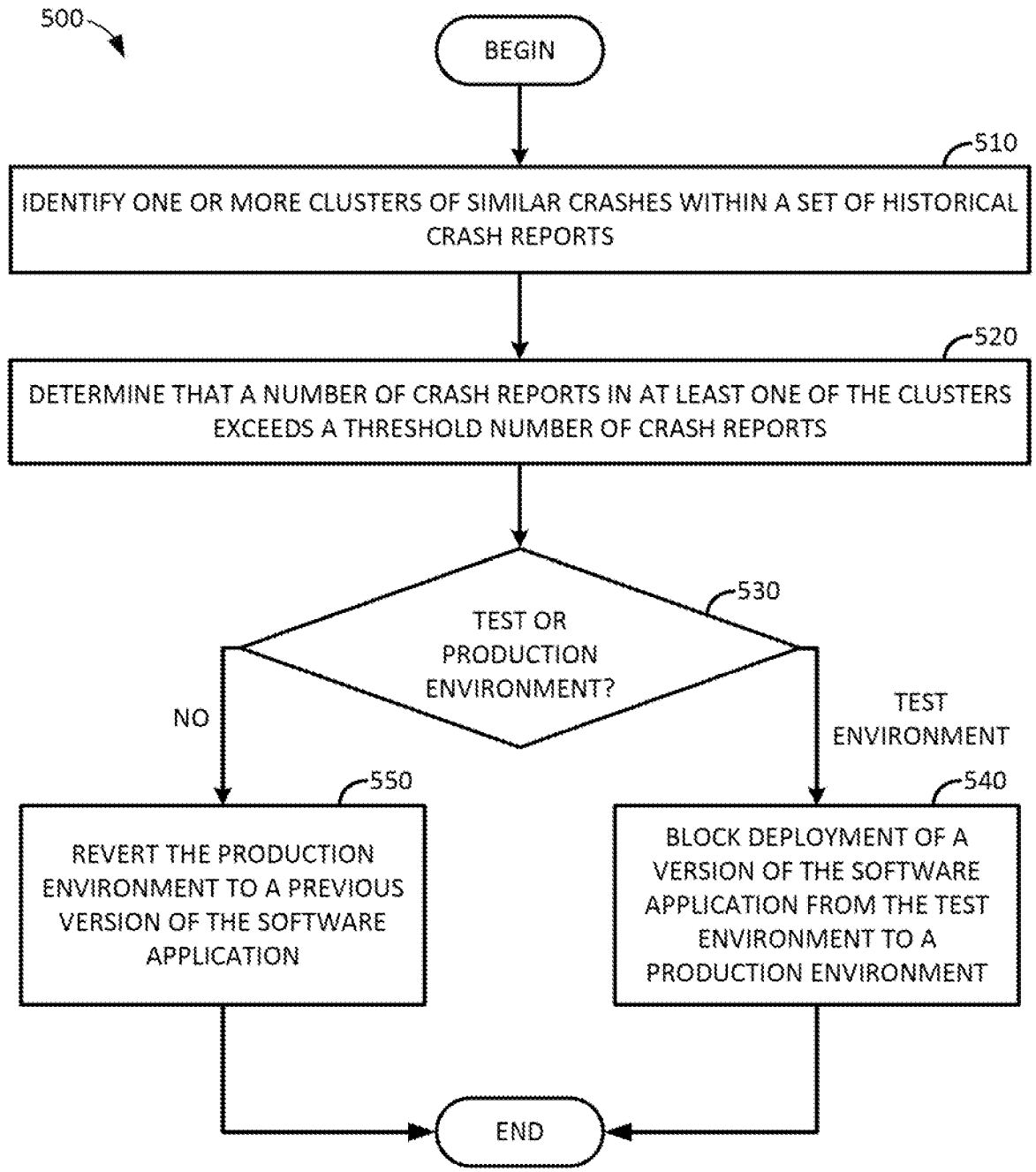
FIG. 5 illustrates example operations for managing deployment of an application in a continuous integration/continuous development (CI/CD) pipeline based on determined crash similarities in historical crash event data.

FIG. 5 illustrates example operations 500 for managing deployment of an application in a continuous integration/continuous development (CI/CD) pipeline based on determined crash similarities in historical crash event data. The operations described herein may be performed, for example, by a deployment manager executing on a computing system in a distributed computing environment (e.g., by deployment manager 124 executing in development environment 120, as illustrated in FIG. 1).

As illustrated, operations 500 begin at block 510, where a system identifies one or more clusters of similar crashes within a historical data set of crash reports. The system can identify these clusters of similar crashes using the techniques discussed above and illustrated in FIG. 4 to determine that a large number of similar errors exist within a historical data set of crash reports. The historical set of crash reports may include, for example, crash reports generated while testing a version of a software application in a testing environment, crash reports generated during execution of a current version of the software application in a production environment, or the like. For example, for a given input crash report, which may be user-defined or selected from the historical data set of crash reports, the system can generate a set of crash reports having similarity scores exceeding a threshold value.

At block 520, the system determines that a number of crash reports in a cluster of similar crashes in the historical data set of crash reports exceeds a threshold number of crash records. Because the number of crash reports in one of the clusters of similar crashes exceeds a threshold number of crash records, the system can determine that the version of the software application being examined does not meet software quality standards.

At block 530, the system determines whether the version of the software application being examined is a version deployed in a production environment or in a test environment. If the version of the software application is deployed in a test environment, at block 540, the system blocks deployment of the version of the software application to a production environment. Generally, in blocking deployment of the version of the software application from the test environment to the production environment, the system can prevent code associated with the version of the software application in the test environment from overwriting code associated with the version of the software application in the production environment and can prevent application binaries in the test environment from overwriting application binaries in the production environment. Deployment of the version of the software application from the test environment to the production environment may be blocked until manually unblocked or subsequent automated testing determines that the underlying error has been rectified.

If, at block 530, the system determines that the version of the software application examined is deployed in a production environment, at block 550, the system can revert the production environment to a previous version of the software application. To identify the version to which the production environment is to be rolled back, the system can determine, based on historical crash reports associated with each of a plurality of previous versions, whether a similar error to that in in the current version of the software application exists. The most recent previous version of the application in which the error does not exist may be selected for deployment to the production environment. In some aspects, the system can, identify modules for which patches should be generated and to identify a priority for generating these patches (e.g., based on a frequency and/or severity of the errors caused by a module in a software application). These patches may be pushed to the production environment in order to rectify errors in the software application. For example, the system can restore the software application to the version deployed in the production environment prior to executing block 550 and can deploy the patches when such patches are made available.

Figure 6:
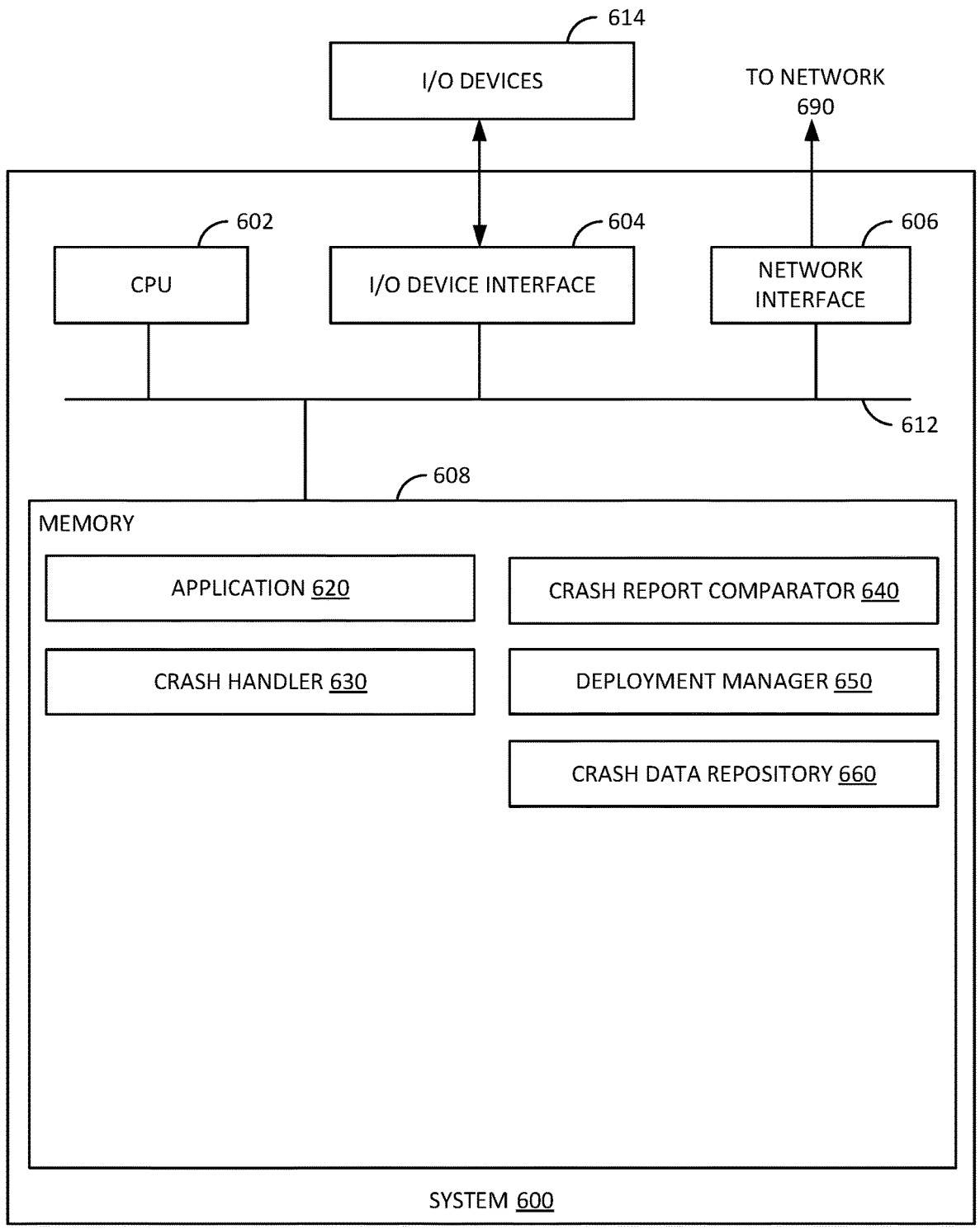
FIG. 6 illustrates an example system on which embodiments of the present disclosure can be performed.

Example System for Handling of Crash Events Based on Crash Similarity Determination Based on Stack Traces and User Action Sequence Information FIG. 6 illustrates an example system 600 that handles crash events based on crash similarity determination based on stack traces and user action sequence information. In one example, system 600 may comprise application server 110 and development environment 120 illustrated in FIG. 1. In another example, where an application executes on a remote computing device (e.g., a mobile phone, tablet, etc.), system 600 may comprise development environment 120 illustrated in FIG. 1 and need not include application 620 and crash handler 630.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 604, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes an application 620, crash handler 630, crash report comparator 640, deployment manager 650, and crash data repository 660. Application 620 may correspond to application 112 illustrated in FIG. 1 and generally is representative of an application for which crash reports may be compared to historical crash reports by crash report comparator 640 and for which deployment may be managed by deployment manager 650.

Crash handler 630 may correspond to crash handler 114 illustrated in FIG. 1 and generally monitors for the occurrence of handled and unhandled exceptions in application 620. When an exception occurs during execution of application 620, crash handler 630 generates a crash record for a crash event associated with the exception and commits the record of the crash event to crash data repository 660. Generally, the crash record includes a memory dump, which may include a stack trace having a plurality of stack frames, information about user actions performed within the application 620 prior to the exception, and location and description information for the crash event.

Crash report comparator 640 may correspond to crash report comparator 122 illustrated in FIG. 1 generally receives information specifying a report for a source crash event and searches for reports of similar crash events from crash data repository 660 (which may correspond to crash data repository 130 illustrated in FIG. 1). To identify similar crash events, crash report comparator generally retrieves one or more crash reports from crash data repository 660 and generates a similarity score for each of the retrieved crash reports. The similarity score may be calculated, for example, as a weighted average of a plurality of similarity metrics. These similarity metrics may include a first similarity metric associated with stack frames in a stack trace included in the received crash report and stack frames in a stack trace included in the respective historical crash report; a second similarity metric associated with user actions associated with the crash report and the respective historical crash report; and a third similarity metric associated with crash location and description information recorded in the received crash report and the respective historical crash report. Generally, crash report comparator 640 can output information about crash reports having similarity scores exceeding a threshold score for display to a user of the system 600 or to deployment manager 650 for use in managing deployment of application source code to a production environment.

Deployment manager 650 may correspond to deployment manager 124 illustrated in FIG. 1 and generally represents a software component that controls deployment of application source code from a test environment to a production environment based on crash similarity identified by crash report comparator 640. To determine whether application source code is ready for promotion from a test environment to a production environment, deployment manager 650 can identify a set of unique crash reports in crash data repository 660 to use as an input into crash report comparator 640. If deployment manager 650 determines that the number of similar crash reports identified by crash report comparator 640 exceeds a threshold value, deployment manager 650 can determine that the application source code is not ready for promotion to a production environment and can block the code from promotion until the underlying problems in the application source code causing the problem are fixed. Deployment manager 650 may also use the similarity scores generated by crash report comparator 640 to determine that an application should be reverted from a current version to a previous version in which an error does not appear during application execution.

Example Clauses

Clause 1: A method for handling crash events in a software application, comprising: receiving a crash report for a crash event recorded during execution of a software application; generating a similarity score between the crash report and one or more historical crash reports associated with historical crash events recorded during execution of the software application, wherein the similarity score is generated by determining, for each respective historical crash report of the one or more historical crash reports: a first similarity metric associated with stack frames in a stack trace included in the crash report and stack frames in a stack trace included in the respective historical crash report and a second similarity metric associated with user actions associated with the crash report and user actions associated with the respective historical crash report; selecting a target set of historical crash reports based on the generated similarity scores for each respective historical crash report of the one or more historical crash reports, wherein the target set of historical crash reports comprises historical crash reports having generated similarity scores exceeding a threshold similarity score; and taking one or more actions to process the crash report based on the targets set of historical crash reports.

Clause 2: The method of Clause 1, wherein: the crash event comprises an unhandled exception encountered during execution of the software application; and the crash location and description information included in the crash report for the crash event comprises one or more of a function name associated with the stack frames in the stack trace included in the crash report, a module name associated with the stack frames in the stack trace included in the crash report, or an exception description.

Clause 3: The method of Clause 1, wherein: the crash event comprises a handled exception encountered during execution of the software application; and the crash location and description information included in the crash report for the crash event comprises one or more of a module name, a function name, or a code line number.

Clause 4: The method of any one of Clauses 1 through 3, wherein the first similarity metric is calculated by: determining a percentage of stack frame entries in the stack trace included in the crash record that are included in the stack trace included in the respective historical crash record, irrespective of an order in which stack frame entries are included in the stack trace included in the crash record and the respective historical crash record; and determining a percentage of stack frame entries in the stack trace included in the respective historical crash record that are included in the stack trace included in the crash record, irrespective of an order in which stack frame entries are included in the stack trace included in the crash record and the respective historical crash record.

Clause 5: The method of any one of Clauses 1 through 4, wherein the second similarity metric is calculated by: determining a percentage of user actions included in the crash record that are included in the respective historical crash record; and determining a percentage of user actions included in the respective historical crash record that are included in the crash record.

Clause 6: The method of any one of Clauses 1 through 5, wherein generating the similarity score comprises generating a weighted average of the first similarity metric and the second similarity metric, and the third similarity metric.

Clause 7: The method of any one of Clauses 1 through 6, wherein: the received crash record is received in a query to identify historical crash events similar to the crash event recorded during execution of the software application; and taking one or more actions to process the crash record based on the target set of historical crash records comprises displaying, within a graphical user interface in a software development environment, the target set of historical crash records and the similarity score associated with each respective historical crash record in the target set of historical crash records.

Clause 8: The method of any one of Clauses 1 through 7, wherein taking one or more actions to process the crash record based on the target set of historical crash records comprises: determining that a number of crash records in the target set of historical crash records exceeds a threshold number of crash records; and blocking deployment of application code associated with the received crash record from a development environment to a production environment until the application code associated with the received crash record is unblocked.

Clause 9: The method of Clause 8, wherein the plurality of historical crash records associated with historical crash events recorded during execution of the software application comprise crash records generated for a current version of the software application deployed in the production environment.

Clause 10: The method of any one of Clauses 1 through 7, wherein taking one or more actions to process the crash record based on the target set of historical crash records comprises: determining that a number of crash records in the target set of historical crash records exceeds a threshold number of crash records and that crash records in the target set of historical crash records are associated with a current version of the software application deployed in a production environment; and reverting from the current version of the software application to a previous version of the software application in the production environment, wherein the previous version of the software application comprises a latest version of the software application in which the crash records in the target set of historical crash records were not generated.

Clause 11: The method of any one of Clauses 1 through 10, wherein the similarity score is generated further by determining, for each respective historical crash report of the one or more historical crash reports, a third similarity metric associated with crash location and description information recorded in the crash report and the respective historical crash report.

Clause 12: A method for managing deployment of a software application in a computing environment, comprising: receiving a crash report for a crash event recorded during execution of a software application; generating a similarity score between the crash report and one or more historical crash reports associated with historical crash events recorded during execution of the software application, wherein the similarity score is generated by determining, for each respective historical crash report of the one or more historical crash reports: a first similarity metric associated with stack frames in a stack trace included in the crash report and stack frames in a stack trace included in the respective historical crash report, and a second similarity metric associated with user actions associated with the crash report and user actions associated with the respective historical crash report; selecting a target set of historical crash reports based on the generated similarity scores for each respective historical crash report of the one or more historical crash reports, wherein the target set of historical crash reports comprises historical crash reports having generated similarity scores exceeding a threshold similarity score; determining that a number of crash records in the target set of historical crash records exceeds a threshold number of crash records; and blocking deployment of application code associated with the received crash record from a development environment to a production environment until the application code associated with the received crash record is unblocked.

Clause 13: A system, comprising: a memory having executable instructions stored thereon; and a processor configured to execute the executable instructions to perform the methods of any one of Clauses 1 through 12.

Clause 14: A system, comprising: means for performing the methods of any one of Clauses 1 through 12.

Clause 15: A computer-readable medium having instructions stored thereon which, when executed by a processor, performs the methods of any one of Clauses 1 through 12.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for handling crash events in a software application, comprising:
   receiving a crash report for a crash event recorded during execution of a software application;
   generating a similarity score between the crash report and one or more historical crash reports associated with historical crash events recorded during execution of the software application, wherein the similarity score is generated by generating, for each respective historical crash report of the one or more historical crash reports: a first similarity metric associated with stack frames in a stack trace included in the crash report and stack frames in a stack trace included in the respective historical crash report, wherein the first similarity metric comprises a metric based on: a percentage of stack frame entries in the stack trace included in the crash report that are included in the stack trace included in the respective historical crash report, irrespective of an order in which stack frame entries are included in the stack trace included in the crash report and the respective historical crash report, and a percentage of stack frame entries in the stack trace included in the respective historical crash report that are included in the stack trace included in the crash report, irrespective of an order in which stack frame entries are included in the stack trace included in the crash report and the respective historical crash report, and a second similarity metric associated with user actions associated with the crash report and user actions associated with the respective historical crash report, wherein the second similarity metric comprises a metric based on: a percentage of user actions included in the crash report that are included in the respective historical crash report, and a percentage of user actions included in the respective historical crash report that are included in the crash report; selecting a target set of historical crash reports based on the generated similarity scores for each respective historical crash report of the one or more historical crash reports, wherein the target set of historical crash reports comprises historical crash reports having generated similarity scores exceeding a threshold similarity score; and controlling deployment of the software application based on the crash report and a number of crash reports included in the target set of historical crash reports.

2. The method of claim 1, wherein:
   the crash event comprises an unhandled exception encountered during execution of the software application; and
   crash location and description information included in the crash report for the crash event comprises one or more of a function name associated with the stack frames in the stack trace included in the crash report, a module name associated with the stack frames in the stack trace included in the crash report, or an exception description.

3. The method of claim 1, wherein:
   the crash event comprises a handled exception encountered during execution of the software application; and
   crash location and description information included in the crash report for the crash event comprises one or more of a module name, a function name, or a code line number.

4. The method of claim 1, wherein generating the similarity score comprises generating a weighted average of the first similarity metric and the second similarity metric.

5. The method of claim 1, wherein:
   the received crash report is received in a query to identify historical crash events similar to the crash event recorded during execution of the software application; and
   the method further comprises displaying, within a graphical user interface in a software development environment, the target set of historical crash reports and the similarity score associated with each respective historical crash report in the target set of historical crash reports.

6. The method of claim 1, wherein controlling deployment of the software application comprises:
   determining that a number of crash reports in the target set of historical crash reports exceeds a threshold number of crash reports; and
   blocking deployment of application code associated with the received crash report from a development environment to a production environment until the application code associated with the received crash report is unblocked.

7. The method of claim 6, wherein the historical crash reports associated with historical crash events recorded during execution of the software application comprise crash reports generated for a current version of the software application deployed in the production environment.

8. The method of claim 1, wherein controlling deployment of the software application comprises:
   determining that a number of crash reports in the target set of historical crash reports exceeds a threshold number of crash reports and that crash reports in the target set of historical crash reports are associated with a current version of the software application deployed in a production environment; and reverting from the current version of the software application to a previous version of the software application in the production environment, wherein the previous version of the software application comprises a latest version of the software application in which the crash reports in the target set of historical crash reports were not generated.

9. The method of claim 1, wherein the similarity score is generated further by determining, for each respective historical crash report of the one or more historical crash reports, a third similarity metric associated with crash location and description information recorded in the crash report and the respective historical crash report.

10. A system, comprising: a computer-readable memory having executable instructions stored thereon; and a processor configured to execute the executable instructions to cause the system to: receive a crash report for a crash event recorded during execution of a software application; generate a similarity score between the crash report and one or more historical crash reports associated with historical crash events recorded during execution of the software application, wherein the similarity score is generated by determining, for each respective historical crash report of the one or more historical crash reports: a first similarity metric associated with stack frames in a stack trace included in the crash report and stack frames in a stack trace included in the respective historical crash report, wherein the first similarity metric comprises a metric based on: a percentage of stack frame entries in the stack trace included in the crash report that are included in the stack trace included in the respective historical crash report, irrespective of an order in which stack frame entries are included in the stack trace included in the crash report and the respective historical crash report, and a percentage of stack frame entries in the stack trace included in the respective historical crash report that are included in the stack trace included in the crash report, irrespective of an order in which stack frame entries are included in the stack trace included in the crash report and the respective historical crash report, and a second similarity metric associated with user actions associated with the crash report and user actions associated with the respective historical crash report, wherein the second similarity metric comprises a metric based on: a percentage of user actions included in the crash report that are included in the respective historical crash report, and a percentage of user actions included in the respective historical crash report that are included in the crash report; select a target set of historical crash reports based on the generated similarity scores for each respective historical crash report of the one or more historical crash reports, wherein the target set of historical crash reports comprises historical crash reports having generated similarity scores exceeding a threshold similarity score; and control deployment of the software application based on the crash report and a number of crash reports included in the targets set of historical crash reports.

11. The system of claim 10, wherein:
the crash event comprises an unhandled exception encountered during execution of the software application; and
crash location and description information included in the crash report for the crash event comprises one or more of a function name associated with the stack frames in the stack trace included in the crash report, a module name associated with the stack frames in the stack trace included in the crash report, or an exception description.

12. The system of claim 10, wherein:
the crash event comprises a handled exception encountered during execution of the software application; and
crash location and description information included in the crash report for the crash event comprises one or more of a module name, a function name, or a code line number.

13. The system of claim 10, wherein the system is configured to generate the similarity score by generating a weighted average of the first similarity metric and the second similarity metric.

14. The system of claim 10, wherein:
the received crash report is received in a query to identify historical crash events similar to the crash event recorded during execution of the software application; and
the processor is further configured to cause the system to display, within a graphical user interface in a software development environment, the target set of historical crash reports and the similarity score associated with each respective historical crash record in the target set of historical crash report.

15. The system of claim 10, wherein in order to control deployment of the software application, the processor is further configured to cause the system to:
determine that a number of crash report in the target set of historical crash report exceeds a threshold number of crash report; and
block deployment of application code associated with the received crash report from a development environment to a production environment until the application code associated with the received crash report is unblocked.

16. A method for managing deployment of a software application in a computing environment, comprising: receiving a crash report for a crash event recorded during execution of a software application; generating a similarity score between the crash report and one or more historical crash reports associated with historical crash events recorded during execution of the software application, wherein the similarity score is generated by determining, for each respective historical crash report of the one or more historical crash reports: a first similarity metric associated with stack frames in a stack trace included in the crash report and stack frames in a stack trace included in the respective historical crash report, wherein the first similarity metric comprises a metric based on: a percentage of stack frame entries in the stack trace included in the crash report that are included in the stack trace included in the respective historical crash report, irrespective of an order in which stack frame entries are included in the stack trace included in the crash report and the respective historical crash report, and a percentage of stack frame entries in the stack trace included in the respective historical crash report that are included in the stack trace included in the crash report, irrespective of an order in which stack frame entries are included in the stack trace included in the crash report and the respective historical crash report, a second similarity metric associated with user actions associated with the crash report and user actions associated with the respective historical crash report, wherein the second similarity metric comprises a metric based on: a percentage of user actions included in the crash report that are included in the respective historical crash report, and a percentage of user actions included in the respective historical crash report that are included in the crash report, and a third similarity metric associated with crash location and description information recorded in the crash report and the respective historical crash report; selecting a target set of historical crash reports based on the generated similarity scores for each respective historical crash report of the one or more historical crash reports, wherein the target set of historical crash reports comprises historical crash reports having generated similarity scores exceeding a threshold similarity score; determining that a number of crash report in the target set of historical crash report exceeds a threshold number of crash report; and blocking deployment of application code associated with the received crash report from a development environment to a production environment until the application code associated with the received crash report is unblocked.

17. The method of claim 16, wherein:
the crash event comprises an unhandled exception encountered during execution of the software application; and
the crash location and description information included in the crash report for the crash event comprises one or more of a function name associated with the stack frames in the stack trace included in the crash report, a module name associated with the stack frames in the stack trace included in the crash report, or an exception description.

18. The method of claim 16, wherein:
the crash event comprises a handled exception encountered during execution of the software application; and
the crash location and description information included in the crash report for the crash event comprises one or more of a module name, a function name, or a code line number.

19. The method of claim 16, wherein generating the similarity score comprises generating a weighted average of the first similarity metric, the second similarity metric, and the third similarity metric.

20. The method of claim 16, wherein the historical crash reports associated with historical crash events recorded during execution of the software application comprise crash reports generated for a current version of the software application deployed in the production environment.

* * * * *